United States Patent
Nakai et al.

(10) Patent No.: US 6,239,970 B1
(45) Date of Patent: May 29, 2001

(54) COOLING ASSISTING DEVICE, COOLING ASSISTING METHOD, ELECTRONIC APPARATUS, AND INFORMATION PROCESSOR

(75) Inventors: Yasuhiro Nakai, Aichi; Yuzo Ozaki, Kanagawa; Osamu Gomibuchi, Chiba; Shigeyuki Hokao, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/453,655

(22) Filed: Dec. 3, 1999

(30) Foreign Application Priority Data

Dec. 4, 1998 (JP) .................................................. 10-345848

(51) Int. Cl.[7] ...................................................... H05K 7/20
(52) U.S. Cl. .......................... 361/695; 361/690; 361/692; 361/694; 361/697; 361/704; 174/15.1; 174/16.1; 174/16.3; 165/80.3; 165/185; 454/184
(58) Field of Search .......................... 361/687, 688–700, 361/719, 720; 174/15.1, 15.2, 16.1, 16.3; 165/80.3, 80.4, 185, 104.33, 104.34; 454/184; 312/223.2

(56) References Cited

U.S. PATENT DOCUMENTS

| 5,704,212 | * | 1/1998 | Eriler et al. ............................ 361/687 |
| 5,768,101 | * | 6/1998 | Cheng .................................... 361/687 |
| 5,793,609 | * | 8/1998 | Donahoe et al. ....................... 361/695 |
| 5,862,037 | * | 1/1999 | Behl ....................................... 361/687 |
| 5,898,569 | * | 4/1999 | Bhatia .................................... 361/700 |
| 5,959,836 | * | 9/1999 | Bhatia .................................... 361/687 |
| 5,974,556 | * | 10/1999 | Jackson et al. ....................... 713/322 |
| 6,043,980 | * | 3/2000 | Katsui .................................... 361/695 |

FOREIGN PATENT DOCUMENTS

| 411039063A | * | 2/1999 | (JP) .................................. G06F/7/20 |
| 411163567A | * | 6/1999 | (JP) .................................. H05K/7/20 |

* cited by examiner

Primary Examiner—Leo P. Picard
Assistant Examiner—Boris L. Chervinsky
(74) Attorney, Agent, or Firm—Frommer Lawrence & Haug, LLP; William S. Frommer; Matthew K. Ryan

(57) ABSTRACT

A cooling assisting device which is connected to an information processor for assisting the cooling of the inside of the information processor. The cooling assisting device includes an executing member, typically, a docking connector for executing communication with the information processor; a sucking member, typically, an air inlet for sucking a specific gas; and a supplying member, typically, an air outlet for supplying the gas sucked by the sucking means to the information processor.

8 Claims, 15 Drawing Sheets

COOLING ASSISTING DEVICE, COOLING ASSISTING METHOD, ELECTRONIC APPARATUS, AND INFORMATION PROCESSOR

BACKGROUND OF THE INVENTION

The present invention relates to a cooling assisting device, a cooling assisting method, an electronic apparatus, and an information processor, and particularly to a cooling assisting device capable of assisting the cooling of an information processor, a cooling assisting method therefor, and an electronic apparatus and an information processor using the cooling assisting device.

Figure 14:
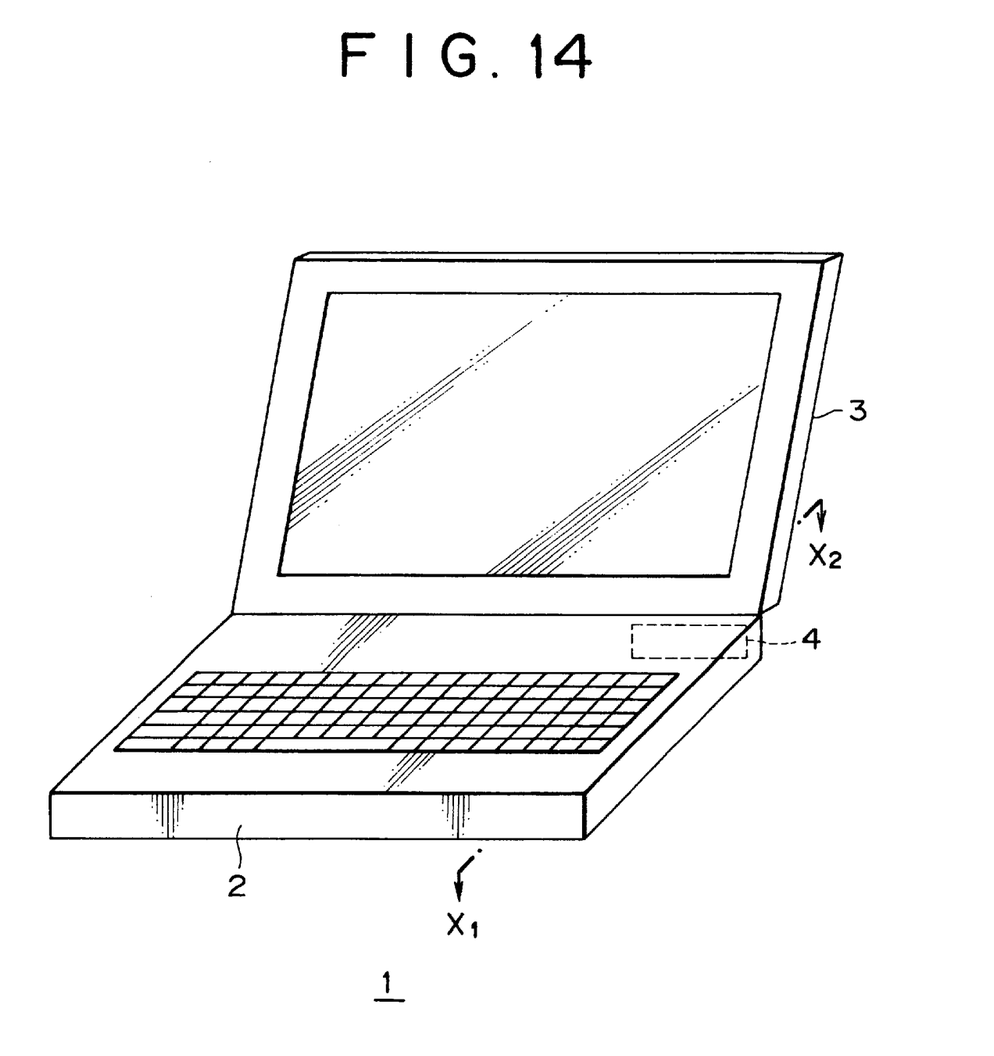
FIG. 14 is a perspective view of an appearance of a related art personal computer.
Figure 15:
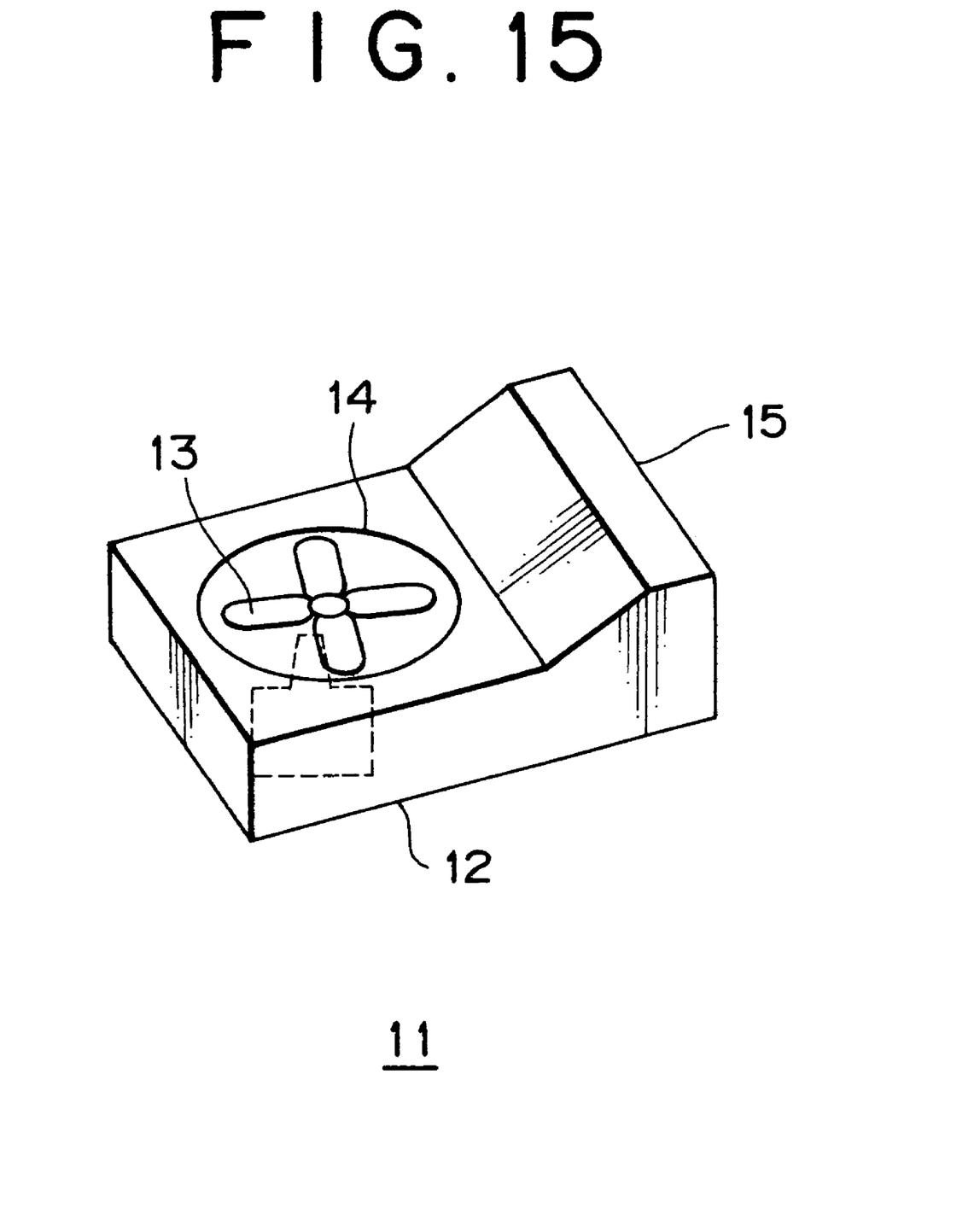
FIG. 15 is a perspective view of an appearance of a cooling unit mounted on the related art personal computer shown in FIG. 14.

FIG. 14 shows a related art personal computer 1 including a main body 2 and a display unit 3. The main body 2 contains devices mounted on a board, such as a CPU and a video chip, which generate heat during operation thereof. To suppress the temperature rise of the whole main body 2, the main body 2 generally has an air outlet 4 disposed typically in the back surface of the main body 2, and also contains a cooling unit 11 as shown in FIG. 15. Air in the main body 2, warmed by heat generated from the devices, is discharged to outside through the air outlet 4 by the cooling unit 11.

The cooling unit 11 shown in FIG. 15 has a housing 12 in which a fan 13 is contained. An air inlet 14 through which outside air is sucked by rotation of the fan 13 is provided in the upper surface of the housing 12, and an air outlet 15 through which the air having been sucked from the air inlet 14 is discharged is provided in one side surface of the housing 12.

Figure 16:
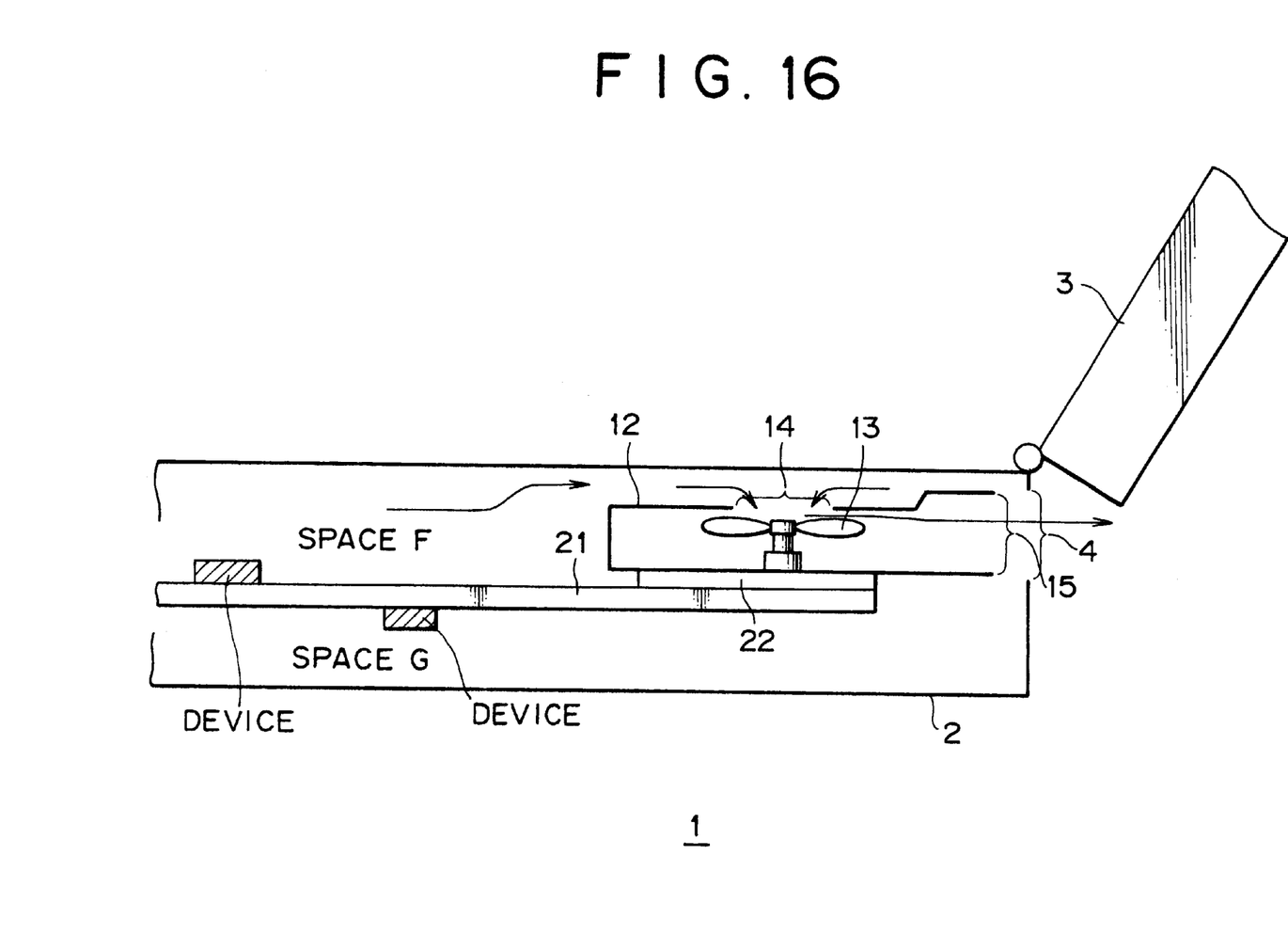
FIG. 16 is a sectional view of FIG. 14.

FIG. 16 is a sectional view taken on line $X_1$–$X_2$ of the personal computer 1 shown in FIG. 14. Referring to FIG. 16, the housing 12 of the cooling unit 11 is connected, via a thermal conductor 22 such as a heat pipe, to the board 21 on which the devices such as a CPU and a video chip are mounted. The cooling unit 11 is mounted in such a manner that the air outlet 15 is aligned to the air outlet 4 of the main body 2.

The cooling function of the cooling unit 11 will be described below. Heat generated from the devices is transferred to the housing 12 of the cooling unit 11 via the board 21 and the thermal conductor 22, to warm air in the housing 12. Since the fan 13 of the cooling unit 11 is rotated to suck outside air (in the main body 2) from the air inlet 14 and discharge it from the air outlet 15, the warmed air in the housing 12 is discharged to outside via the air outlet 15 of the cooling unit 11 and the air outlet 4 of the main body 2. In this way, the devices as a heat source and the board 21 on which the devices are mounted are cooled by discharging the air in the housing 12, which has been warmed by heat having been transferred via the board 21 and the thermal conductor 22.

The heat from the devices or the board 21 also warms air in spaces F and G, to increase the temperature of the air in the spaces F and G. The warmed air in the spaces F and G is sucked in the cooling unit 11 from the air inlet 14 and is discharged to outside via the air outlet 15 of the cooling unit 11 and the air outlet 4 of the main body 2 by rotation of the fan 13 of the cooling unit 11. In this way, the spaces F and G are cooled by discharging the warmed air in the spaces F and G to outside.

The temperature rise of the whole main body 2 is suppressed by cooling respective portions in the main body 2 as described above.

However, in recent years, along with the miniaturization of the personal computer 1, the main body 2 has come to be thinned, and more concretely the height of the main body 2 has come to be lowered. Accordingly, a gap between the air inlet 14 of the cooling unit 11 and the inner wall of the main body 2 has come to be made narrow. This presents a problem that air does not smoothly flow in the gap, with a result that the sucking of air in the cooling unit 11 from the air inlet 14 is insufficient, so that the temperature rise of the main body 2 cannot be sufficiently suppressed.

SUMMARY OF THE INVENTION

An object of the present invention is to provide a cooling assisting device capable of allowing air in a main body to smoothly flow, a cooling method therefor, and an electronic apparatus and an information processor using the cooling assisting device.

To achieve the above object, according to the present invention, there is provided a cooling assisting device which is connected to an information processor for assisting the cooling of the inside of said information processor, said cooling assisting device including: an executing means for executing communication with said information processor; a sucking means for sucking a specific gas; and a supplying means for supplying said gas sucked by said sucking means to said information processor.

According to the present invention, there is also provided a cooling assisting method using a cooling assisting device which is connected to an information processor for assisting the cooling of the inside of said information processor, said cooling assisting method including the steps of: executing communication with said information processor; sucking a specific gas; and supplying said gas sucked at said sucking step to said information processor.

With the configuration of the above cooling apparatus and cooling method, since a specific gas is sucked and is supplied to the information processor, it is possible to assist the cooling of the information processor.

According to the present invention, there is also provided an electron apparatus which is connected to an information processor and is communicated with said information processor for executing a specific processing operation, said electronic apparatus including: an executing means for executing communication with said information processor; a sucking means for sucking a specific gas; and a supplying means for supplying said gas sucked by said sucking means to said information processor.

With the configuration of the above electron apparatus, since a specific gas is sucked and is supplied to the information processor, it is possible to assist the cooling of the information processor.

According to the present invention, there is also provided an information processor to be connected to a specific apparatus, including: an executing means for executing communication with said specific apparatus; a sucking means for sucking a specific gas supplied by said specific apparatus; and a cooling means for cooling the inside of said information processor with the aid of said gas sucked by said sucking means.

With the configuration of the above information processor, since a specific gas is supplied to the information processor, it is possible to sufficiently cool the inside of the information processor.

DETAILED DESCRIPTION OF THE PREFERRED EMBODIMENTS

A cooling assisting device according to the present invention includes an executing means (for example, a docking connector D in FIG. 2) for executing communication with said information processor; a sucking means (for example, an air inlet 62 shown in FIG. 2) for sucking a specific gas; and a supplying means (for example, an air outlet 61 shown in FIG. 2) for supplying said gas sucked by said sucking means to said information processor.

An electron apparatus includes an executing means (for example, a docking connector D in FIG. 2) for executing communication with said information processor; a sucking means (for example, an air inlet 62 shown in FIG. 2) for sucking a specific gas; and a supplying means (for example, an air outlet 61 shown in FIG. 2) for supplying said gas sucked by said sucking means to said information processor.

An information processor includes an executing means (for example, a connector C shown in FIG. 1) for executing communication with a specific apparatus; a sucking means (for example, an air inlet 51 shown in FIG. 1) for sucking a specific gas supplied by said specific apparatus; and a cooling means (for example, a cooling unit 11 shown in FIG. 7) for cooling the inside of said information processor with the aid of said gas sucked by said sucking means.

Figure 1:
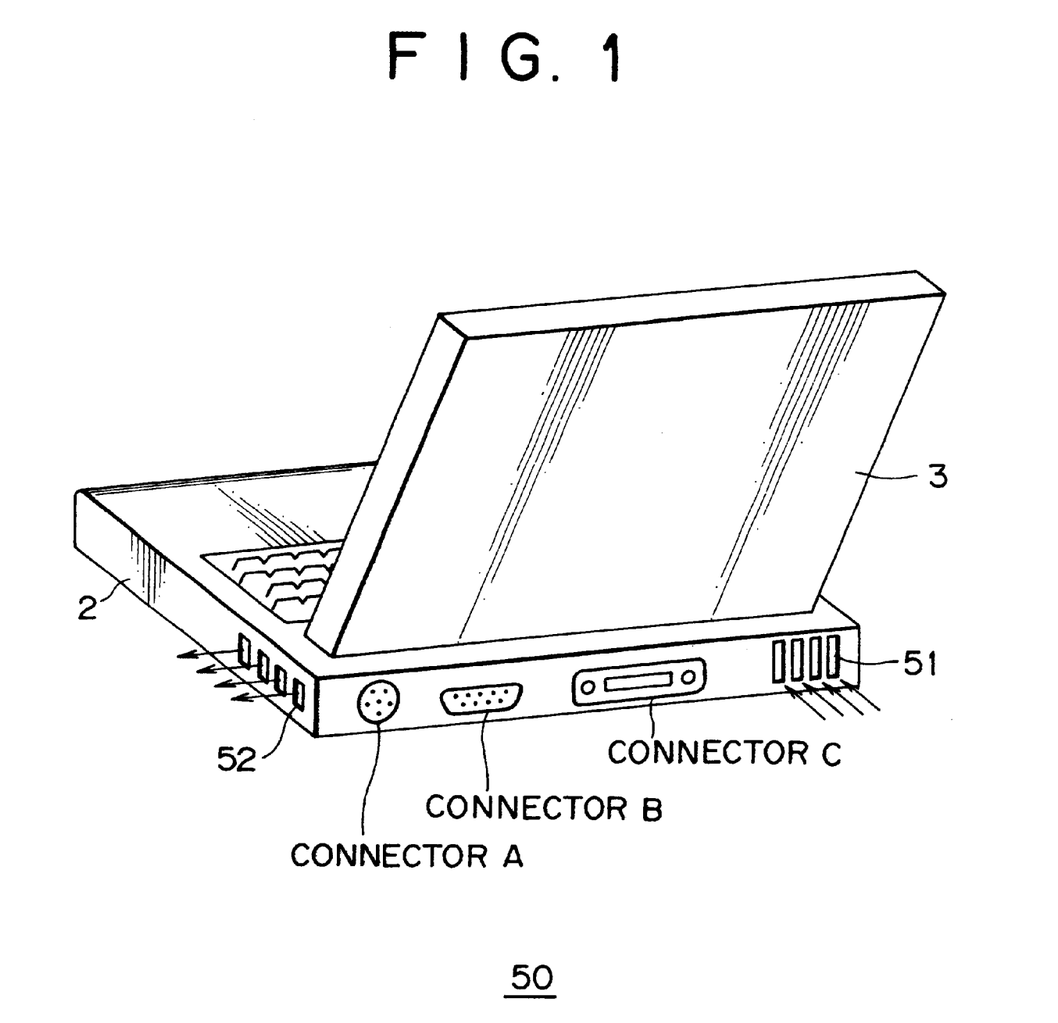
FIG. 1 is a perspective view of an appearance of a first embodiment of a personal computer to which the present invention is applied.

FIG. 1 is a perspective view, seen in a direction extending obliquely from back, of an appearance of a first embodiment of a personal computer 50 to which the present invention is applied. In the figure, parts corresponding to those shown in FIG. 14 are designated by the same characters and the overlapped description thereof is omitted. In this embodiment, an air inlet 51, and connectors A, B and C are provided in the back surface of a main body 2, and an air outlet 52 is provided in a right side surface of the main body 2. The same cooling unit 11 as that shown in FIG. 15 is mounted in the main body 2 at a specific position.

Figure 2:
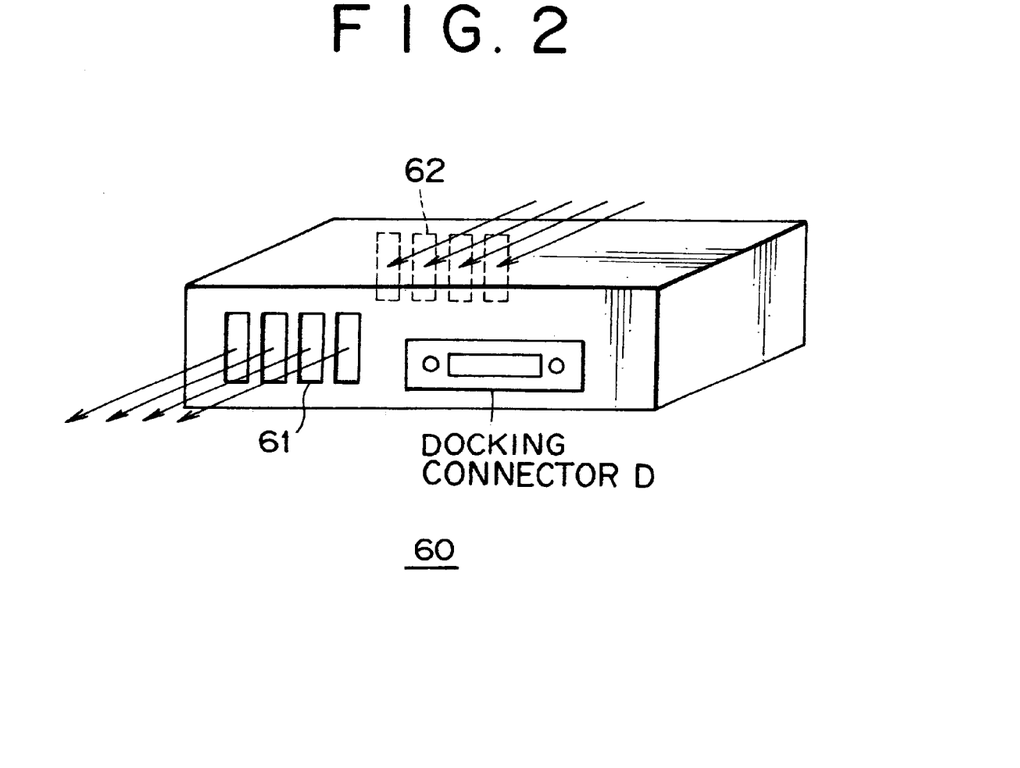
FIG. 2 is a perspective view of an appearance of a first embodiment of a docking station to which the present invention is applied.
Figure 3:
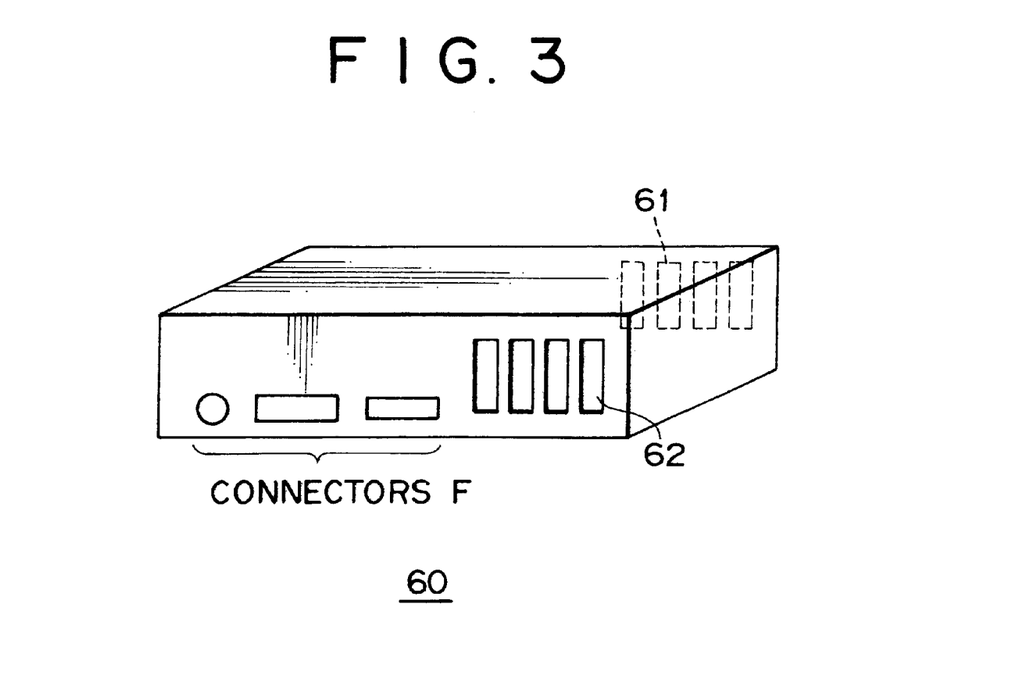
FIG. 3 is a perspective view of another appearance of the first embodiment of the docking station shown in FIG. 2.

FIG. 2 is a perspective view, seen in a direction extending obliquely from front, of an appearance of a first embodiment of a docking station 60 to which the present invention is applied, and FIG. 3 is a perspective view, seen in a direction obliquely from back, of an appearance of the first embodiment of the docking station 60.

An air outlet 61 is provided in the front surface of the docking station 60, and a docking connector D to be connected to the connector C of the personal computer 50 is also provided in the front surface of the docking station 60. An air inlet 62 is provided in the back surface of the docking station 60 at a position corresponding to that of the air outlet 61 on the front side. A plurality of connectors F are provided in the back surface of the docking station 60.

Figure 4:
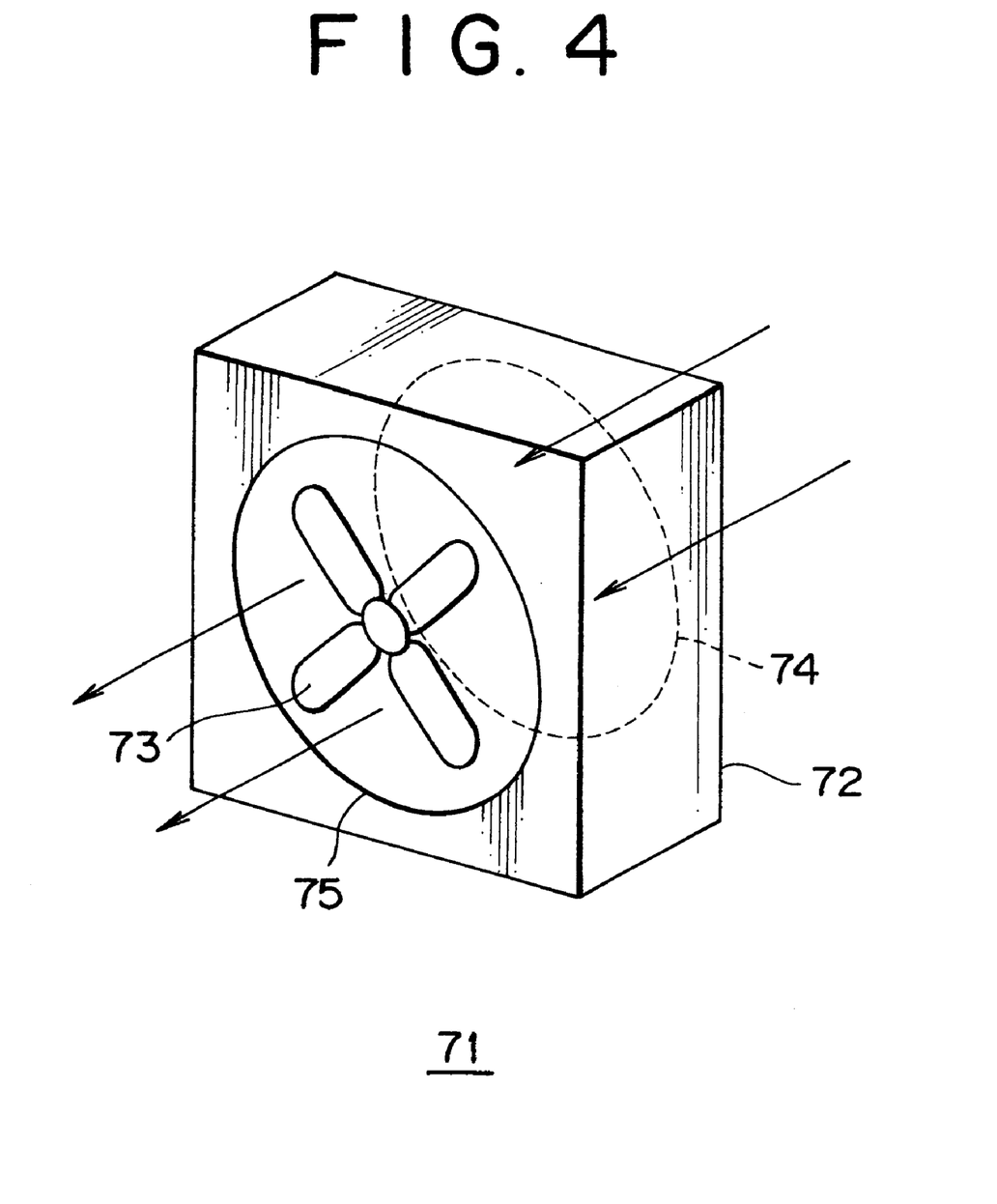
FIG. 4 is a perspective view of an appearance of a cooling unit.

A cooling unit 71 shown in FIG. 4 is mounted in the docking station 60. The cooling unit 71 shown in FIG. 4 has a housing 72 in which a fan 73 is contained. An air inlet 74 from which outside air is sucked by rotation of the fan 73 is provided in a side surface of the housing 72, and an air outlet 75 from which the air thus sucked from the air inlet 74 is discharged is provided opposite to the air inlet 74.

Figure 5:
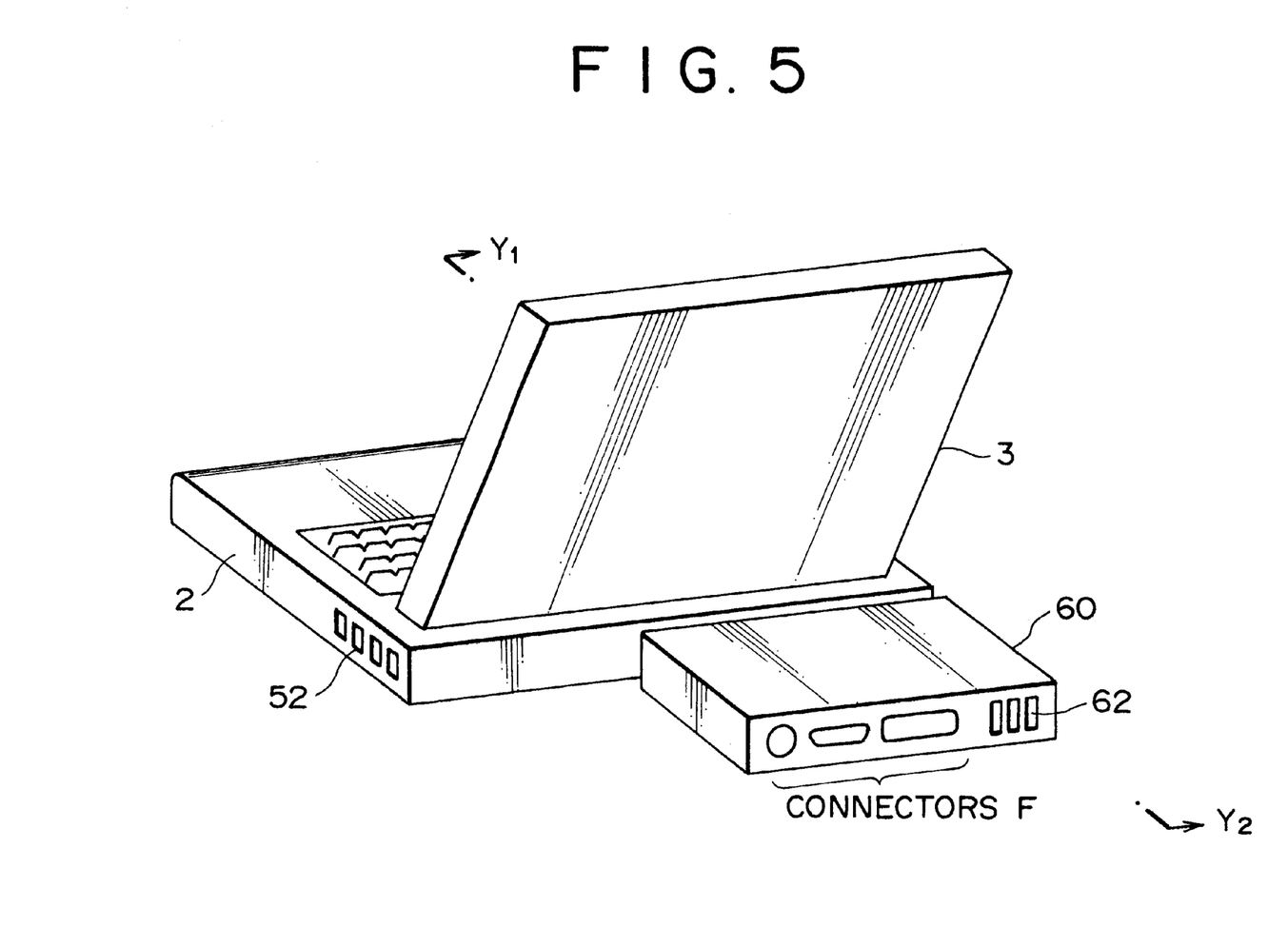
FIG. 5 is a view showing a state in which the personal computer shown in FIG. 1 is connected to the docking station shown in FIG. 2.

As shown in FIG. 5, the docking station 60 having the above configuration is docked to the main body 2 of the personal computer 50 by connecting the docking connector D to the connector C of the personal computer 50. In such a state, the docking station 60 allows communication of signals with the personal computer 50, thereby executing a specific processing in place of the personal computer 50.

Next, a flow path through which air sucked from the air inlet 62 of the docking station 60 is discharged from the air outlet 52 of the main body 2 will be described with reference to FIGS. 6 and 7.

Figure 6:
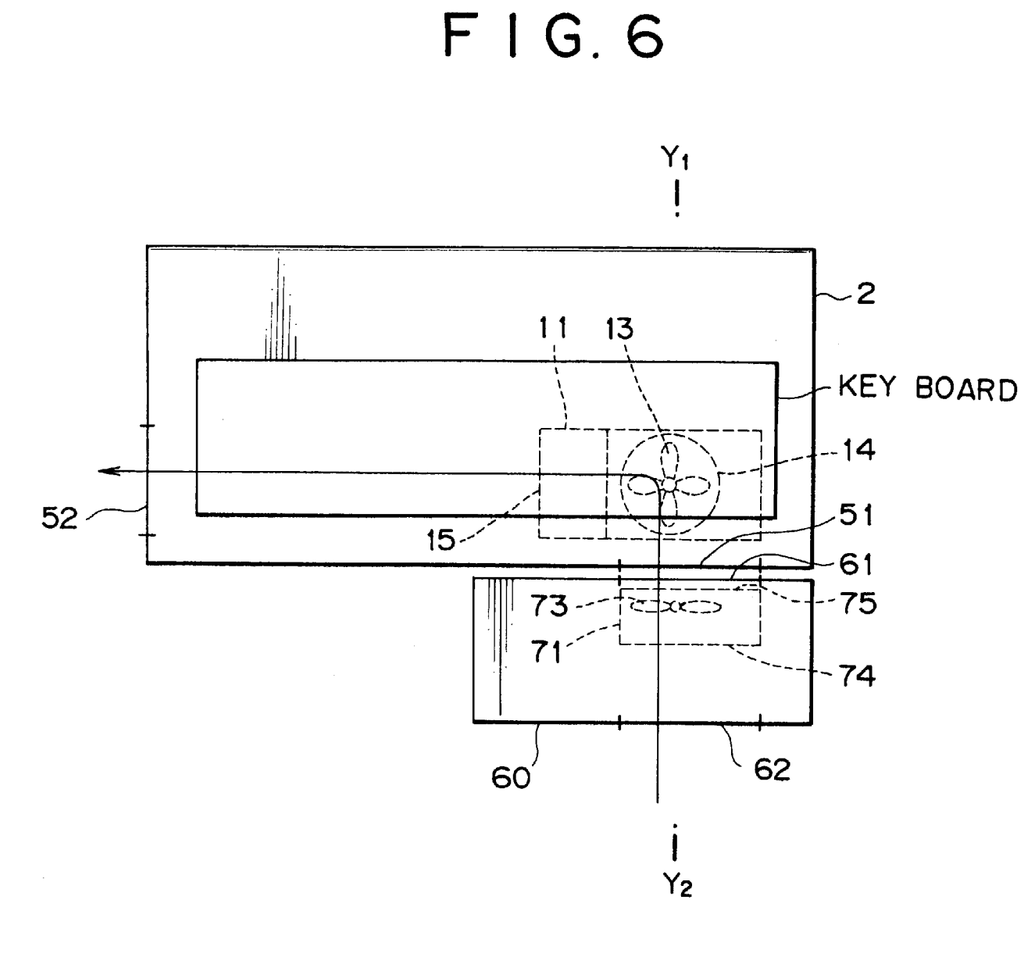
FIG. 6 is a plan view shown in FIG. 5.

FIG. 6 is a plan view of FIG. 5, showing mounting positions of the cooling units 11 and 71. The cooling unit 11 of the main body 2 is mounted on the lower right side in such a manner that the air outlet 15 is directed to the air outlet 52 of the main body 2. The cooling unit 71 of the docking station 60 is mounted in such a manner that the air inlet 74 is aligned to the air inlet 62 of the docking station 60 and the air outlet 75 is aligned to the air outlet 61 of the docking station 60.

In this way, air sucked from the air inlet 62 of the docking station 60 is discharged to outside by way of the air inlet 74 of the cooling unit 71, the air outlet 75 of the cooling unit 71, the air outlet 61 of the docking station 60, the air inlet 51 of the main body 2, the air inlet 14 of the cooling unit 11, the air outlet 15 of the cooling unit 11, and the air outlet 52 of the main body 2.

Figure 7:
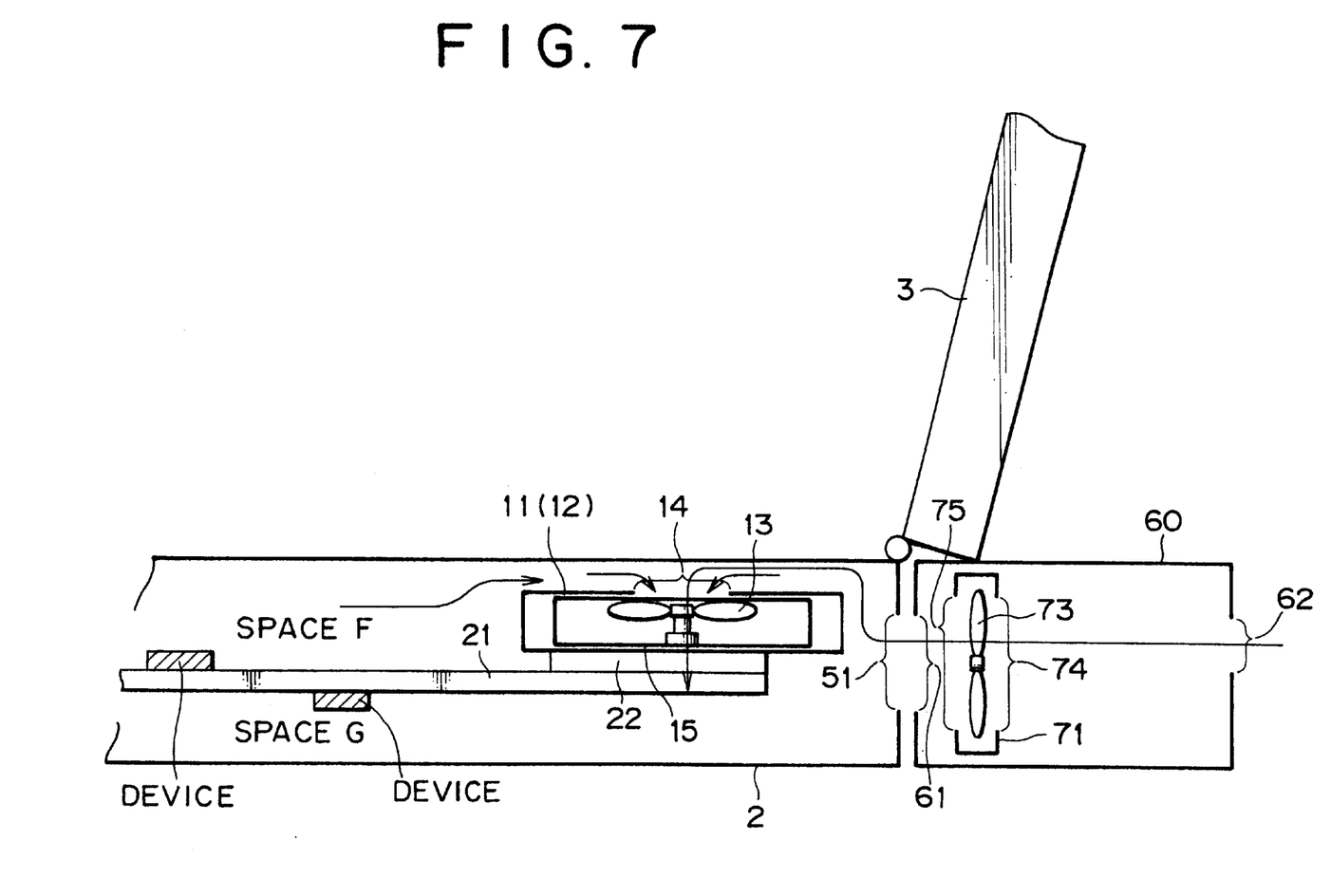
FIG. 7 is a sectional view taken on line $Y_1$–$Y_2$ of FIG. 5.

FIG. 7 is a sectional view taken on line $Y_1$–$Y_2$ of FIGS. 5 and 6, showing the mounting positions of the cooling units 11 and 71. It should be noted that parts corresponding to those shown in FIG. 16 are designated by the same characters and the overlapped description is omitted. Air sucked from the air inlet 62 of the docking station 60 is discharged to outside by way of the air inlet 74 of the cooling unit 71, the air outlet 75 of the cooling unit 71, the air outlet 61 of the docking station 60, the air inlet 51 of the main body 2, the air inlet 14 of the cooling unit 11, the air outlet 15 of the cooling unit 11, and the air outlet 52 of the main body 2 (which is not shown in FIG. 7).

Since air sucked from the air inlet 62 of the docking station 60 is supplied to the main body 2 as described above, the air in the main body 2 is allowed to smoothly flow, with a result that the air warmed in the main body 2 is sufficiently discharged.

Figure 8:
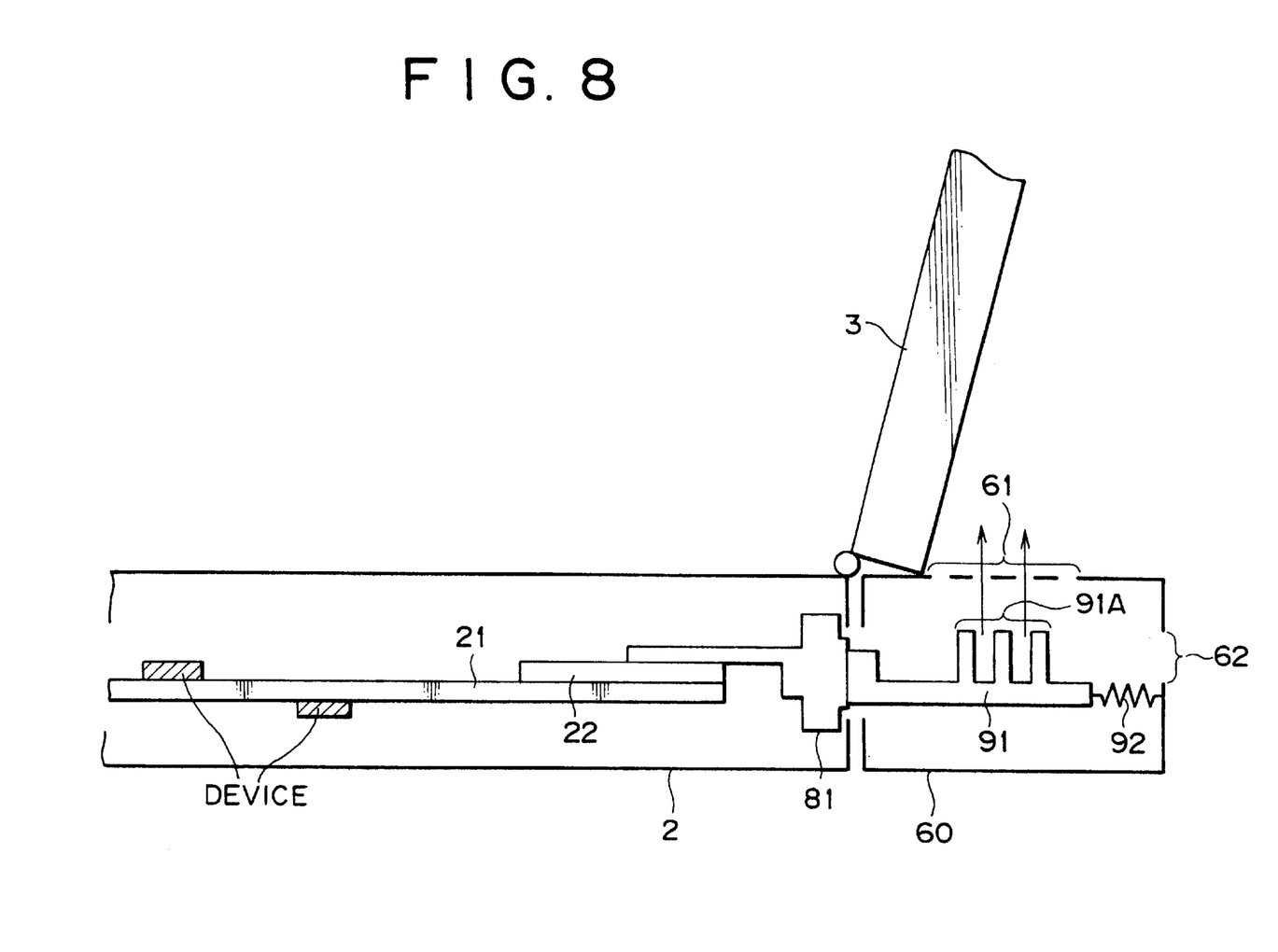
FIG. 8 is a sectional view showing a state in which a second embodiment of the personal computer is connected to a second embodiment of the docking station.

FIG. 8 is a sectional view, similar to FIG. 7, showing a state in which a second embodiment of the personal computer 50 is connected to a second embodiment of the docking station 60 in the same manner as that shown in FIG. 5. It should be noted that parts corresponding to those shown in FIG. 7 are designated by the same characters and the overlapped description is omitted. In the second embodiment of the personal computer 50, a thermal conductor 81 is mounted on the thermal conductor 22 in place of the cooling unit 11. In the second embodiment of the docking station 60, the cooling unit 71 is removed and instead a thermal conductor 91 having fins 91A, typically configured as a heat sink, and a spring 92 are newly provided. In this case, the air outlet 61 is provided in the upper surface of the docking station 60.

When the main body 2 is connected to the docking station 60 as shown in FIG. 8, the thermal conductor 91 is pushed to the thermal conductor 81 of the main body 2 by the effect of the spring 92 of the docking station 60, with a result that heat from the devices is transferred to the thermal conductor 91 of the docking station 60 via the board 21 and the thermal conductors 22 and 81. The heat thus transferred to the thermal conductor 91 is released from the air outlet 61 via the air in the docking station 60.

Figure 9:
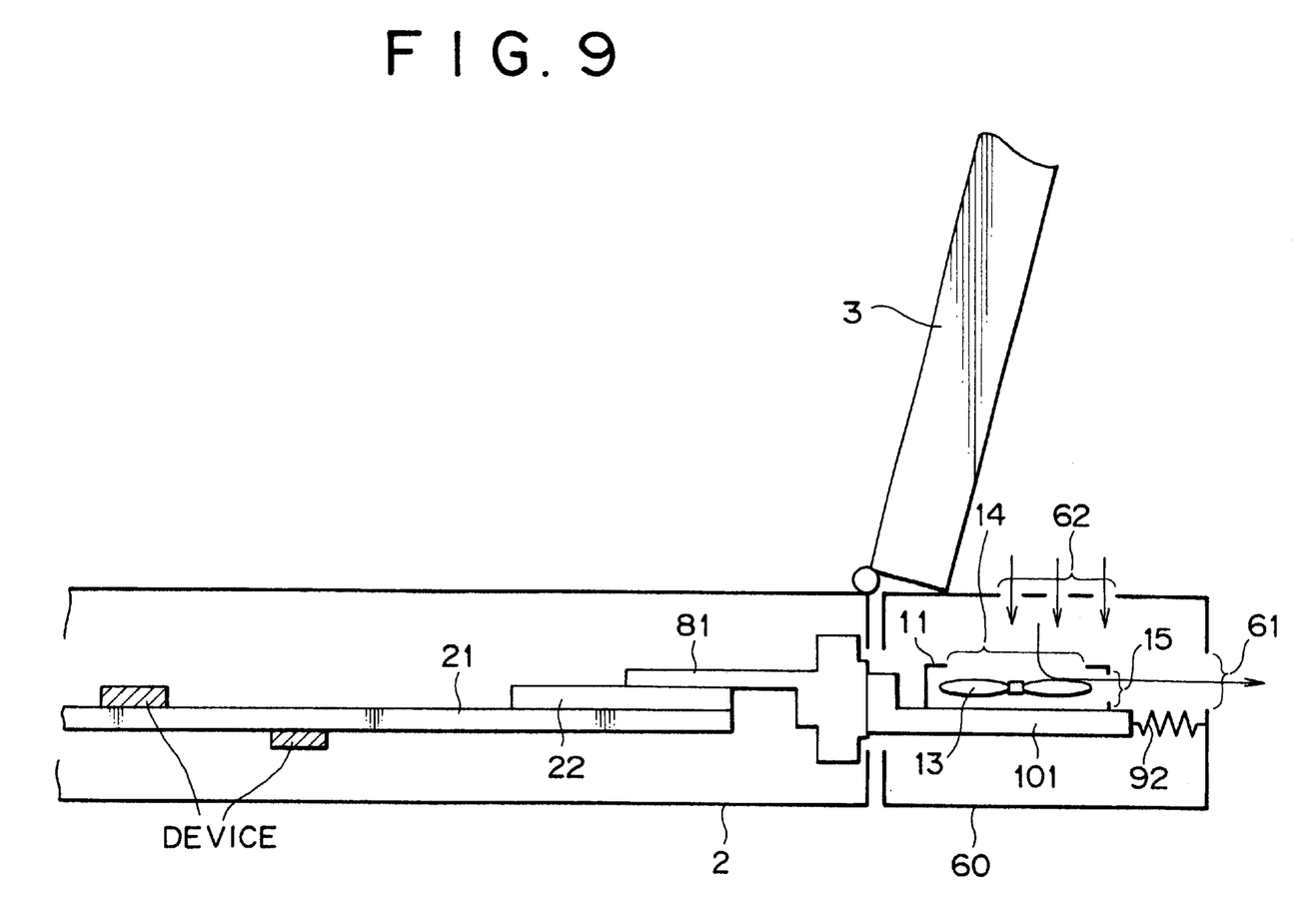
FIG. 9 is a sectional view showing a state in which the second embodiment of the personal computer is connected to a third embodiment of the docking station.

FIG. 9 is a sectional view, similar to FIG. 8, showing a state in which the second embodiment of the personal computer 50 is connected to a third embodiment of the docking station 60 in the same manner as that shown in FIG. 5. It should be noted that parts corresponding to those shown in FIG. 8 are designated by the same characters and the overlapped description is omitted. In the third embodiment of the docking station 60, a thermal conductor 101 is provided in place of the thermal conductor 91, and the cooling unit 11 is mounted on the thermal conductor 101. The position of the air outlet 61 is replaced with that of the air inlet 62. To be more specific, the air inlet 62 is provided in the upper surface and the air outlet 61 is provided is provided in the rear surface.

Like the case shown in FIG. 8, heat generated from the devices is transferred to the thermal conductor 101 of the docking station 60 via the board 21 and the thermal conductors 22 and 81. In this case, cooled outside air is sucked from the air inlet 62 of the docking station 60 by the cooling unit 11, and is discharged to outside through the air inlet 14 and the air outlet 15 of the cooling unit 11 and through the air outlet 61 of the docking station 60. The thermal conductor 101 is cooled by allowing cooled outside air to flow in the cooling unit 11.

Figure 10:
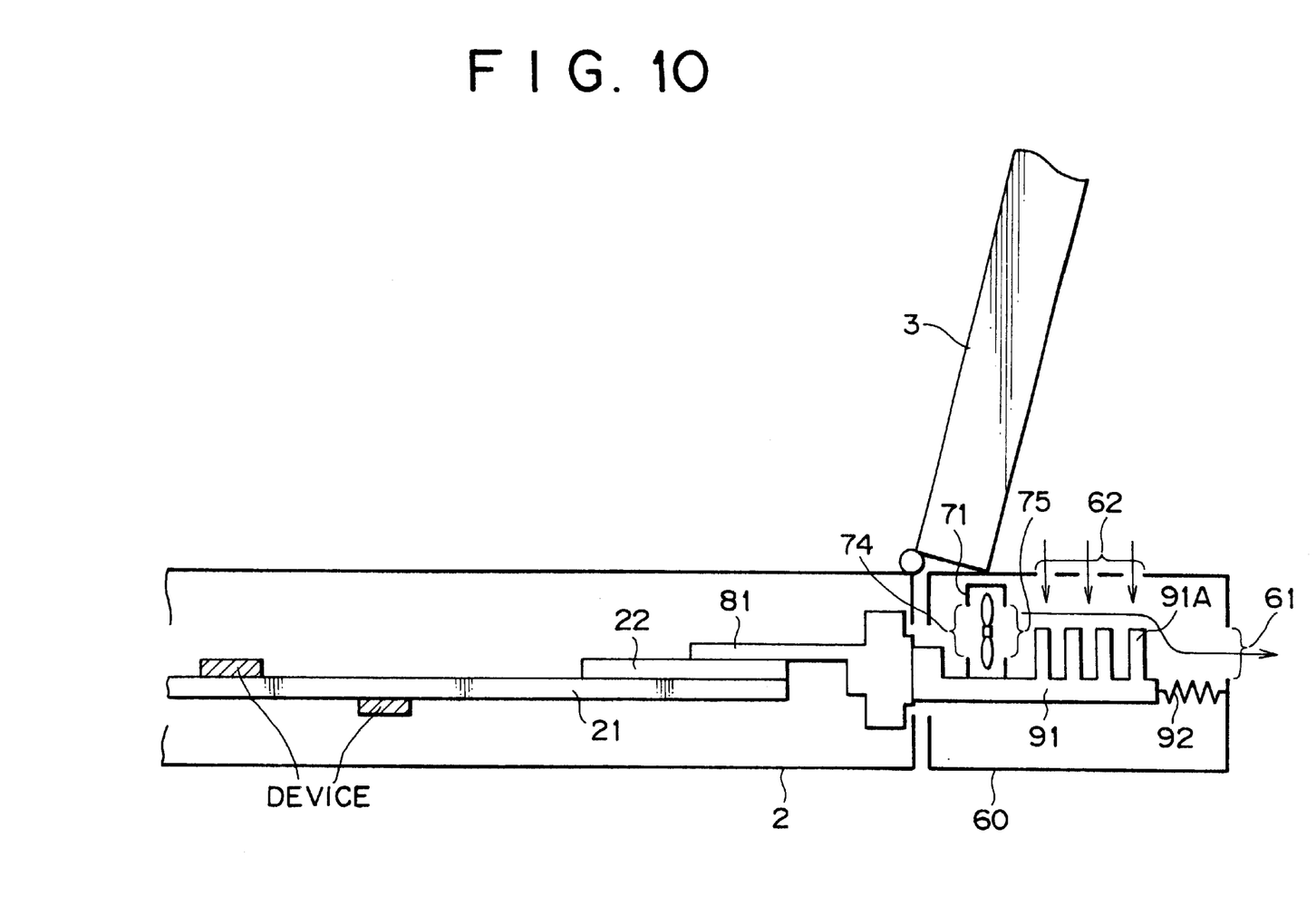
FIG. 10 is a sectional view showing a state in which the second embodiment of the personal computer is connected to a fourth embodiment of the docking station.

FIG. 10 is a sectional view, similar to FIG. 8, showing a state in which the second embodiment of the personal computer 50 is connected to a fourth embodiment of the docking station 60 in the same manner as that shown in FIG. 5. It should be noted that parts corresponding to those shown in FIG. 8 are designated by the same characters and the overlapped description is omitted. In the fourth embodiment of the docking station 60, the cooling unit 71 is mounted on the upper surface of the thermal conductor 91. The position of the air outlet 61 is replaced with that of the air inlet 62. To be more specific, the air inlet 62 is provided in the upper surface and the air outlet 61 is provided in a side surface.

Like the case shown in FIG. 8, heat generated from the devices is transferred to the thermal conductor 91. In this case, the fins 91A of the thermal conductor 91 are cooled by air discharged from the air outlet 75 of the cooling unit 71, and thereby the thermal conductor 91 itself is cooled.

Figure 11:
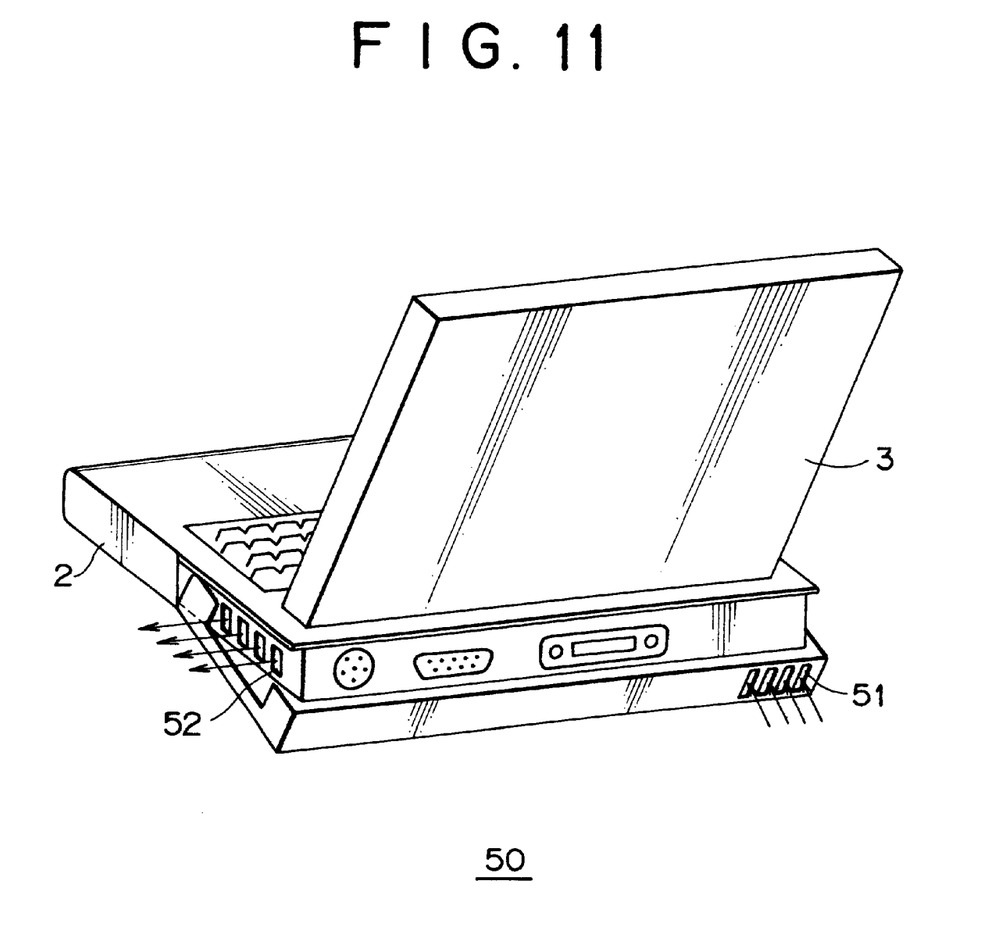
FIG. 11 is a perspective view of an appearance of a third embodiment of the personal computer.

FIG. 11 is a perspective view, seen in a direction extending obliquely from back, of an appearance of a third embodiment of the personal computer 50. In the third embodiment of the personal computer 50, a rear bottom surface portion of the main body 2 is openable. In this case, the cooling unit 11 is mounted in the main body 2 at a specific position.

Figure 12:
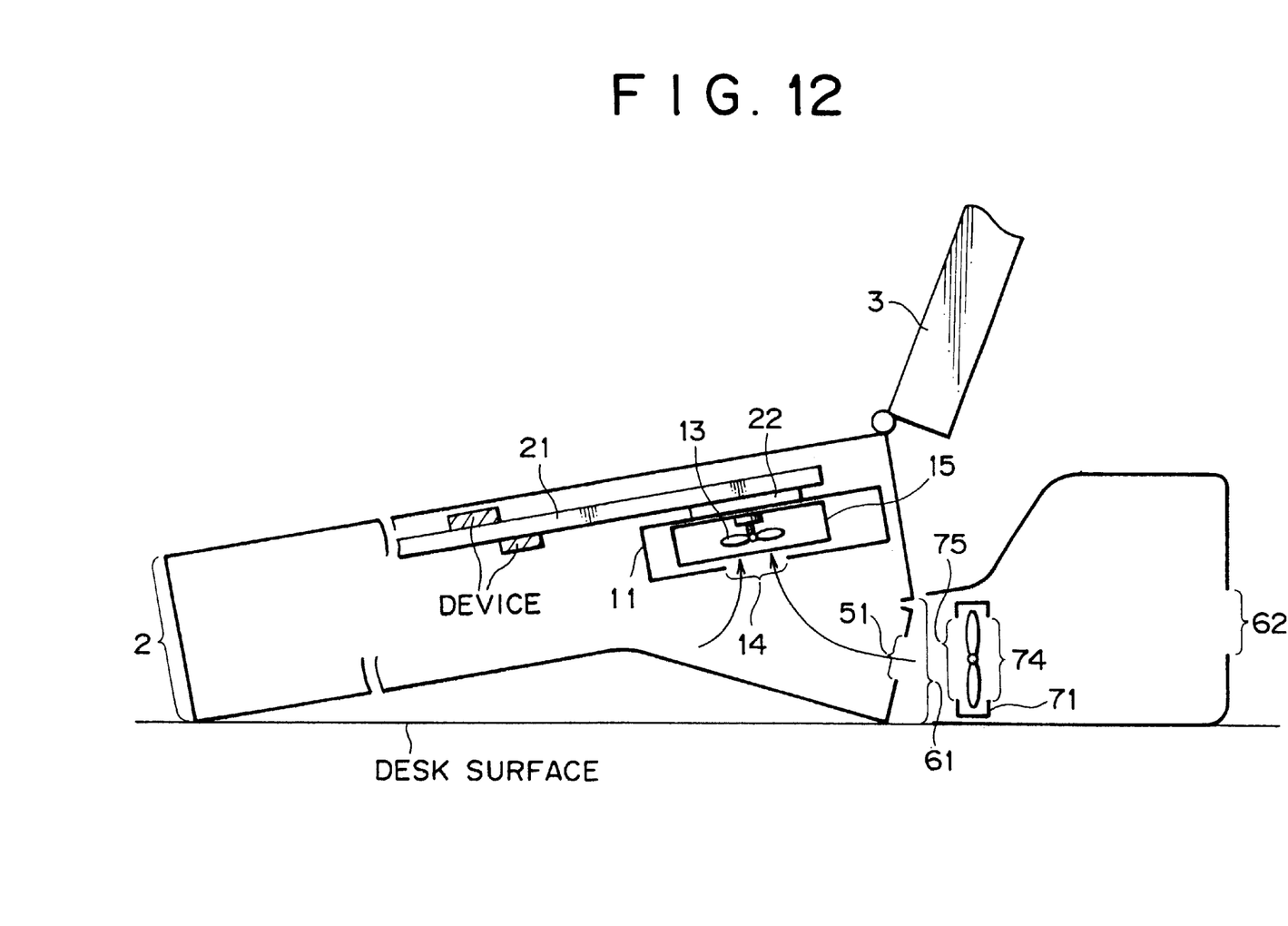
FIG. 12 is a sectional view showing a state in which the third embodiment of the personal computer is connected to the first embodiment of the docking station.

FIG. 12 is a sectional view, similar to FIG. 8, showing a state in which the third embodiment of the personal computer 50 is connected to the first embodiment of the docking station 60 in the same manner as that shown in FIG. 5. In the third embodiment of the personal computer 50, the cooling unit 11 is mounted in such a manner that the air inlet 14 is directed downwardly.

Air sucked from the air inlet 62 of the docking station 60 is supplied to the inside of the main body 2 by way of the air inlet 74 of the cooling unit 71, the air outlet 75 of the cooling unit 71, the air outlet 61 of the docking station 60, and the air inlet 51 of the main body 2. Air supplied from the docking station 60 into the main body 2 is sucked, together with the air in the main body 2, from the air inlet 14 of the cooling unit 11, and is discharged to outside through the air outlet 15 of the cooling unit 11 and the air outlet 52 of the main body 2 (which is not shown in FIG. 12).

Figure 13:
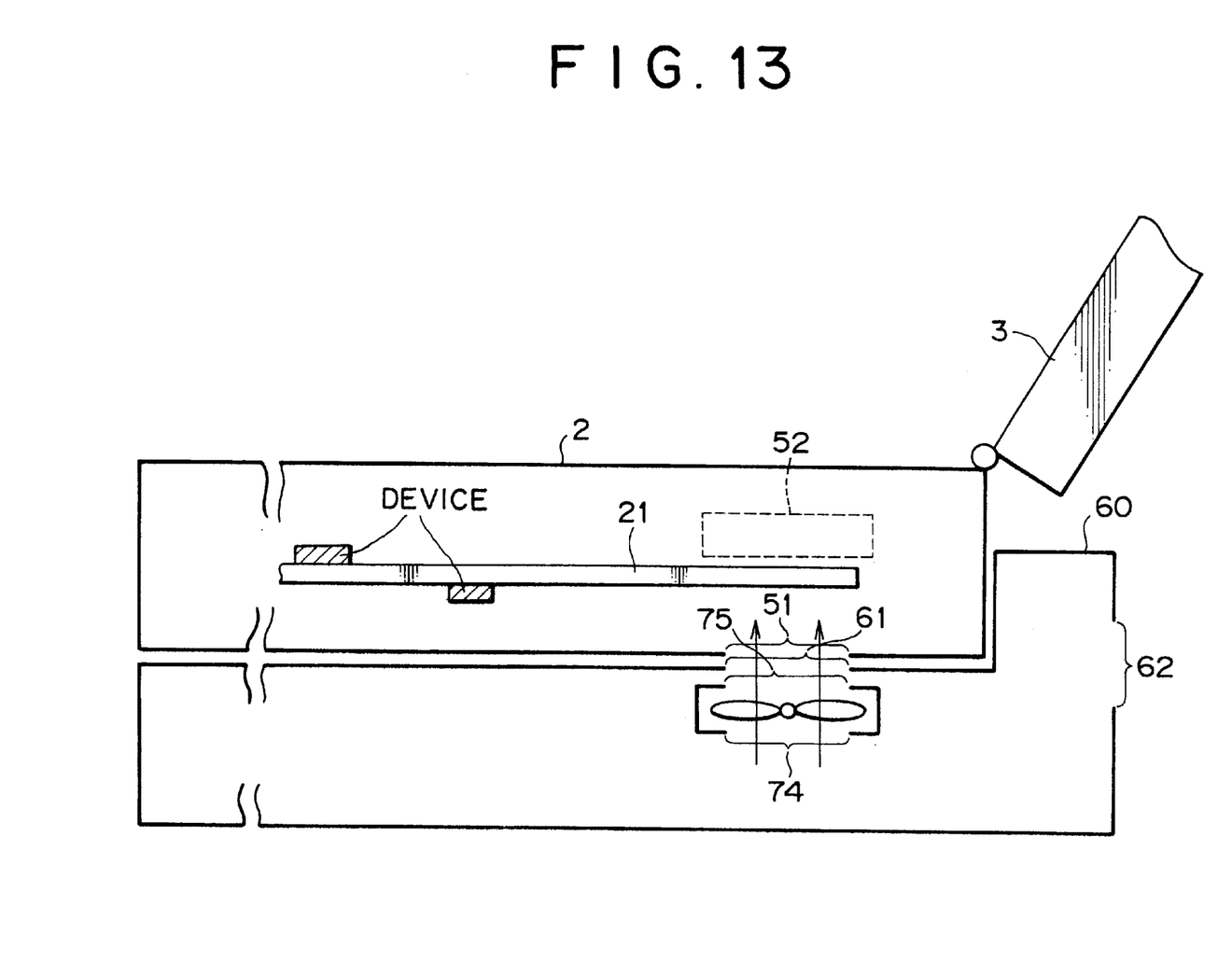
FIG. 13 is a sectional view showing a state in which a fourth embodiment of the personal computer is connected to a fifth embodiment of the docking station.

FIG. 13 is a sectional view, similar to FIG. 8, showing a state in which a fourth embodiment of the personal computer 50 is connected to a fifth embodiment of the docking station 60 in the same manner as that shown in FIG. 5. The docking station 60 is mounted on the whole bottom surface of the main body 2. Outside air sucked from the air inlet 62 of the docking station 60 is supplied to the main body 2 by way of the air inlet 74 of the cooling unit 71, the air outlet 75 of the cooling unit 71, the air outlet 61 of the docking station 60, and the air inlet 51 of the main body 2.

While the preferred embodiments have been described using the specific terms, such description is for illustrative purposes only, and it is to be understood that changes and variations may be made without departing from the spirit or scope of the following claims.

What is claimed is:

1. A cooling assisting device which is connected to an information processor for assisting the cooling of the inside of said information processor, said cooling assisting device comprising:

a docking connector providing for electrical communication with said information processor;

inlet means provided in a back surface of the cooling assisting device for receiving a specified gas into said cooling assisting device;

outlet means provided in a front surface of said cooling assisting device for communicating with said information processor to supply the gas received by said inlet means into said information processor and wherein said outlet means does not extend into said information processor; and first fan means positioned between said inlet means and said outlet means in the cooling assisting device for moving said gas between said inlet means and said outlet means wherein said inlet means, said first fan means and said outlet means permit said gas to flow in the same plane through said cooling assisting device.

2. A cooling assisting device according to claim 1, wherein said inlet means includes an air inlet formed in the back surface of the cooling assisting device, and said outlet means includes an air outlet formed in the front surface of the cooling assisting device.

3. A cooling assisting device according to claim 2, wherein:

said first fan means has an air inlet and an air outlet which are aligned to said air inlet and said air outlet of said cooling assisting device, respectively;

wherein said information processor comprises a second fan means having an air outlet which directs gas to an air outlet of said information processor.

4. A cooling assisting device according to claim 2, further comprising:

a first thermal conducting means having fins; and a biasing means for biasing said first thermal conducting means;

wherein said air outlet of said cooling assisting device is disposed over said first thermal conducting means; and said information processor comprises a second thermal conducting means to which said first thermal conducting means is pushed by the action of said biasing means.

5. A cooling assisting device according to claim 2, further comprising:

a first thermal conducting means formed into a flat shape;

a biasing means for biasing said first thermal conducting means; and a cooling means placed on said first thermal conducting means, said cooling means having an air inlet aligned to said air inlet of said cooling device;

wherein said information processor comprises a second thermal conducting means to which said first thermal conducting means is pushed by the action of said biasing means; and said air inlet of said cooling device is disposed over said first conducting means for cooling said first thermal conducting means with outside air.

6. A cooling assisting device according to claim 2, further comprising:

a first thermal conducting means having fins;

a biasing means for biasing said first thermal conducting means; and a cooling means placed on said first thermal conducting means, said cooling means having an air outlet directed to said first thermal conducting means, respectively;

wherein said information processor comprises a second thermal conducting means to which said first thermal conducting means is pushed by the action of said biasing means; and said air inlet of said cooling device is disposed over said first thermal conducting means, whereby said first thermal conducting means is cooled with outside air supplied through said air outlet of said cooling device.

7. A cooling assisting method using a cooling assisting device which is connected to an information processor for assisting the cooling of the inside of said information processor, said cooling assisting method comprising the steps of:

executing electrical communication with said information processor by means of a docking connector of said cooling assisting device;

inletting a specified gas into said cooling assisting device through an air inlet means provided in a back surface of said cooling assisting device;

supplying said gas received at said inletting step into said information processor by communication means of said cooling assisting device which provides communication between said cooling assisting device and said information processor without said communication means extending into said information processor; and moving said gas received by said inlet means to said outlet means by means of a first fan means positioned between said inlet means and said outlet means; and directing gas in the same plane through said cooling assisting device between said inlet means, said first fan means and said outlet means.

8. An electronic apparatus which is connected to an information processor and is in communication with said information processor for executing a specific processing operation, said electronic apparatus comprising:

a docking connector providing for electrical communication with said information processor;

inlet means provided in a back surface of the electronic apparatus for receiving a specified gas into said electronic apparatus;

outlet means provided in a front surface of the electronic apparatus for communicating with said information processor to supply the gas received by said inlet means into said information processor and wherein said supplying means does not extend into said information processor; and fan means positioned between said inlet means and said outlet means in the electronic apparatus for moving said gas between said inlet means to said outlet means wherein said inlet means, said fan means and said outlet means permit said gas to flow in the same plane through said electronic apparatus.

* * * * *